United States Patent
Perstnev et al.

(10) Patent No.: US 9,738,798 B2
(45) Date of Patent: *Aug. 22, 2017

(54) METHOD OF REPAIRING LEAKAGE IN PIPELINES

(71) Applicant: Curapipe System Ltd., Ashkelon (IL)

(72) Inventors: Samuel Perstnev, Merkaz Shapira (IL); Reonald Oukhanov, Ashkelon (IL)

(73) Assignee: CURAPIPE SYSTEM LTD., Ashkelon (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/256,486

(22) Filed: Apr. 18, 2014

(65) Prior Publication Data

US 2014/0311605 A1    Oct. 23, 2014

Related U.S. Application Data

(63) Continuation of application No. 12/521,781, filed as application No. PCT/IL2007/001633 on Dec. 31, 2007, now Pat. No. 9,045,648.

(30) Foreign Application Priority Data

Jan. 1, 2007    (IL) .......................................... 180474

(51) Int. Cl.
| | |
|---|---|
| *F16L 55/18* | (2006.01) |
| *C09D 7/12* | (2006.01) |
| *F16L 55/1645* | (2006.01) |

(52) U.S. Cl.
CPC ........ *C09D 7/1233* (2013.01); *F16L 55/1645* (2013.01); *F16L 55/18* (2013.01)

(58) Field of Classification Search
USPC ......................... 138/97, 98; 405/150.2, 184.1
See application file for complete search history.

(56) References Cited

U.S. PATENT DOCUMENTS

| | | | |
|---|---|---|---|
| 2,804,147 A | 8/1957 | Pistole | |
| 3,108,012 A | 10/1963 | Curtis | |

(Continued)

FOREIGN PATENT DOCUMENTS

| | | |
|---|---|---|
| EP | 0 593 264 B1 | 4/1994 |
| EP | 0 713 048 | 5/1996 |

(Continued)

OTHER PUBLICATIONS

International Search Report mailed May 16, 2008 in PCT/IL2007/001633.

*Primary Examiner* — James Hook
(74) *Attorney, Agent, or Firm* — Foley & Lardner LLP

(57) ABSTRACT

A method of repairing leakage in pipelines comprising the steps of forming a first and second openings (14a, 14b) in the pipeline (10) upstream and downstream, respectively, of the leakage location, inserting through the first opening (14a) a first body (C1), filling the space arrear of the first body (C1) with a first viscose sealing material (M1), inserting through the first opening (14a) a second body (C2) arrear of the first viscose sealing material (M1) compressing the first sealing material by applying a pressure against the first and the second bodies (C1, C2) in opposite directions, causing the first and second bodies (C1, C2) and the compressed first sealing material (M1) to move in unison in the direction of the second opening (14b), and retrieving the first and second bodies (C1, C2). Preferably, the method is performed using three bodies (C1, C2, C3) and two sealing materials (M1, M2).

16 Claims, 5 Drawing Sheets

(56) References Cited

U.S. PATENT DOCUMENTS

| | | | |
|---|---|---|---|
| 3,137,318 A | 6/1964 | Remo et al. | |
| 3,272,894 A * | 9/1966 | Roach | 264/36.16 |
| 3,356,777 A | 12/1967 | Barrett | |
| 3,472,285 A * | 10/1969 | Ginsburgh et al. | 138/97 |
| 3,834,422 A * | 9/1974 | Larson | 138/97 |
| 3,885,521 A * | 5/1975 | von Arx | 118/105 |
| 3,894,131 A * | 7/1975 | Speech | 264/36.11 |
| 4,216,738 A * | 8/1980 | Muta | B05B 13/0627 |
| | | | 118/306 |
| 4,306,821 A * | 12/1981 | Moore | E02D 5/64 |
| | | | 405/211 |
| 4,397,890 A | 8/1983 | Kinumoto et al. | |
| 4,430,841 A * | 2/1984 | Yamaguchi et al. | 52/742.16 |
| 4,440,194 A | 4/1984 | Kinumoto et al. | |
| 4,582,551 A * | 4/1986 | Parkes | F16L 55/16455 |
| | | | 138/97 |
| 4,656,207 A * | 4/1987 | Jabloner | C08G 59/50 |
| | | | 428/209 |
| 4,692,479 A * | 9/1987 | Schneider | B22C 1/2273 |
| | | | 523/142 |
| 4,720,884 A * | 1/1988 | Ralls | B08B 9/0553 |
| | | | 15/104.061 |
| 5,230,842 A | 7/1993 | Munde | |
| 5,372,162 A | 12/1994 | Frey | |
| 5,447,664 A | 9/1995 | Ito et al. | |
| 5,599,856 A * | 2/1997 | Gardner | C08G 59/24 |
| | | | 523/453 |
| 5,609,186 A | 3/1997 | Satake et al. | |
| 5,853,629 A | 12/1998 | Toyoda et al. | |
| 5,983,948 A | 11/1999 | Yagi et al. | |
| 5,993,581 A | 11/1999 | Toyoda et al. | |
| 6,057,378 A | 5/2000 | Perstnev et al. | |
| 6,161,588 A | 12/2000 | Bellamy et al. | |
| 7,127,902 B1 * | 10/2006 | Levy | 62/77 |
| 8,015,998 B2 * | 9/2011 | Harris | 138/97 |
| 2005/0288395 A1 * | 12/2005 | Simon | C08G 59/4085 |
| | | | 523/400 |
| 2006/0084727 A1 * | 4/2006 | Yan | C08G 59/226 |
| | | | 523/444 |
| 2008/0068922 A1 * | 3/2008 | Voss | B01F 7/00808 |
| | | | 366/134 |
| 2008/0144426 A1 * | 6/2008 | Janssen | A61C 5/064 |
| | | | 366/130 |
| 2012/0067447 A1 * | 3/2012 | Ryan | E21B 29/10 |
| | | | 138/97 |

FOREIGN PATENT DOCUMENTS

| | | |
|---|---|---|
| GB | 2 261 486 | 5/1993 |
| RU | 2063273 | 7/1996 |

* cited by examiner

METHOD OF REPAIRING LEAKAGE IN PIPELINES

FIELD OF THE INVENTION

The present invention relates to the repair or restoration of local cracks in pipes, in particular of large diameter water, fuel or gas underground pipelines. More specifically the invention concerns the repair of such pipes when the exact site to be repaired is either unknown or unreachable.

BACKGROUND OF THE INVENTION

In order to conduct water, fuel or gas over large distances, pipelines that span immense lengths are installed. Occasionally, due to corrosion or other different wearing processes, small cracks might occur in the pipes, resulting in a leakage of the fluid that flows through the pipe. Since the pressure in such pipes may reach up to 100 at., the fluid is rapidly lost into the soil.

A leakage is usually discovered by a sharp pressure-drop, or by the recognition of a stain over the leakage location, indicating that a large amount of the fluid has already been lost. Besides the environment-harming aspect, such leakages may cause the loss of thousands of dollars per hour.

The repair of underground pipelines poses a series of complicated technological problems considering the relevant factors, mainly, difficult accessibility to the damaged part of the pipelines if welding or complete replacement thereof needs to be applied. This is particularly true when considering pipelines that are thousand of kilometers long or pipelines that lay underneath buildings and roads.

Also due to the high pressure prevailing in the pipeline, the use of simple adhesives and other common sealing agents had to be ruled-out.

The closest prior art known to applicants is Russian Patent No. 2063273 (Appln. No. 92007181/26 filed Nov. 23, 1992), describing a method of in-situ repair (namely from the inside of the pipe), by injecting specific chemical substances from both sides of the damaged location.

It is the prime object of the present invention to provide a more efficient method of in-situ repair of pipelines.

It is a further object of the invention that the actual repair process be completed instantly, reducing to a minimum the time period during which the flow through the pipeline must be discontinued.

It is a still further object of the invention to offer one or more sealing agents formulations especially suitable for the purposes the invention herein disclosed.

SUMMARY OF THE INVENTION

According to the invention there is provided a method of repairing leakage in pipelines comprising the steps of forming a first opening in the pipeline upstream of the leakage location, forming a second opening in the pipeline downstream of the leakage location, inserting through the first opening a first body, conforming the size of the pipeline, into the pipeline downstream of the first opening, filling the space arrear of the first body with a first viscose sealing material, inserting through the first opening a second body conforming the size of the pipeline into the pipeline arrear of the first viscose sealing material, compressing the first sealing material by applying a pressure against the first and the second bodies in opposite directions, causing the first body, the compressed first sealing material and the second body to move in unison in the direction of the second opening, and retrieving the first and second bodies from the pipeline through the second opening.

The method preferably comprises the further steps of filling the space arrear of the second body with a second viscose sealing material, inserting through the first opening a third body, conforming the size of the pipeline, into the pipeline arrear of the second viscose sealing material, compressing the first and second sealing materials by applying a pressure against the first and the third bodies in opposite directions, causing the first body, the compressed first sealing material, the second body, the compressed second sealing material, and the third body to move in unison in the direction of the second opening, and retrieving the first, second and third bodies from the pipeline through the second opening.

The said bodies are preferably spherical, made of a semi-rigid material such as Polyurethane.

BRIEF DESCRIPTION OF THE DRAWINGS

These and additional constructional features and advantages of the present invention will become more readily understood in the light of the ensuing description of preferred embodiments thereof, given by way of example only, with reference to the accompanying drawings, wherein—

DETAILED DESCRIPTION OF THE PREFERRED EMBODIMENTS

Figure 1:
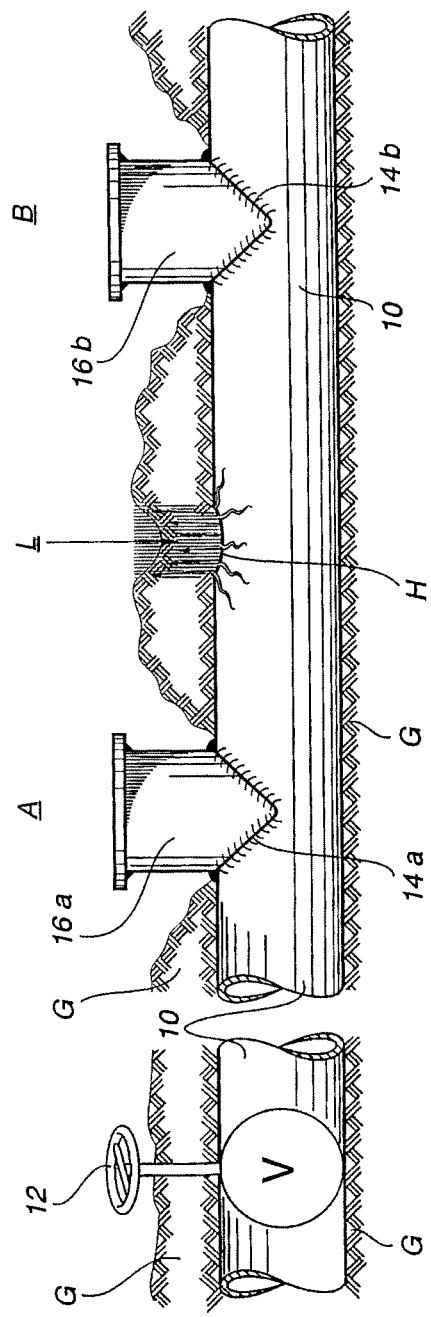
FIG. 1 is a schematic layout of a typical pipeline with a leaking portion and including a preparatory stage of the repair method according to a preferred embodiment of the present invention.

In FIG. 1 there is shown a length of pipeline 10 buried in ground G. Anywhere upstream of the pipeline 10 there is provided a shutting valve 12.

A leaking location L has been identified, typically due to a hole or a crack H caused by excessive corrosion developed over many years of use.

The first stage of the repairing method consists of shutting-off the flow in the pipe by the valve 12 and digging-away the ground over the pipe at two distanced locations A and B at both sides of the leaking location L. The distances A to L and B to L need not be equal, and in fact selected according to the accessibility conditions which may change from one site to another.

At each location A and B, the pipe is torch-cut so as to form a first circular opening 14a, and a second circular opening 14b, respectively, both of a diameter equal to that of the pipe 10. Up-rise pipe sections ("manholes") 16a and 16b are welded or otherwise affixed to the pipe 10, as shown.

Figure 2A:
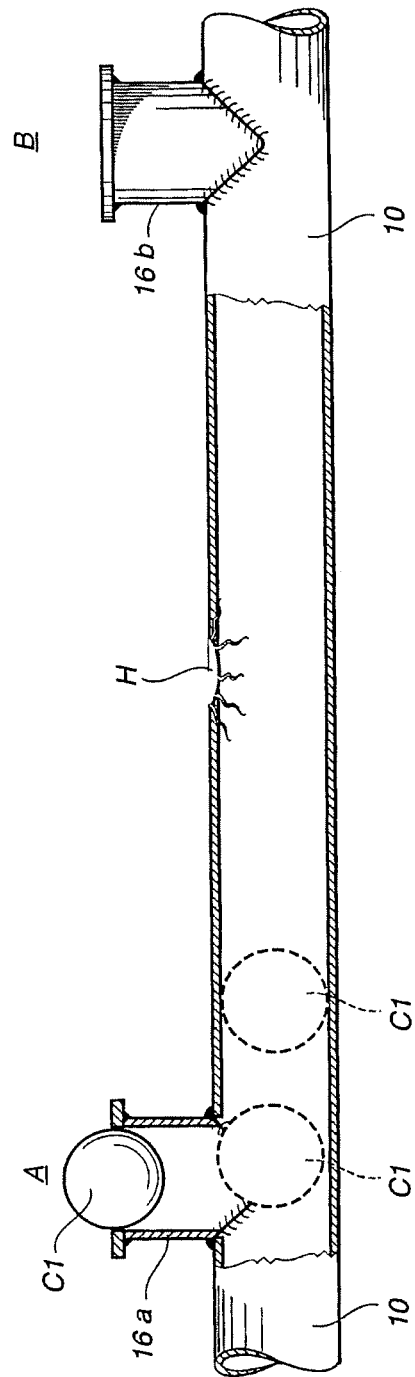
FIGS. 2a-2g represent further steps of the method.
Figure 2B:
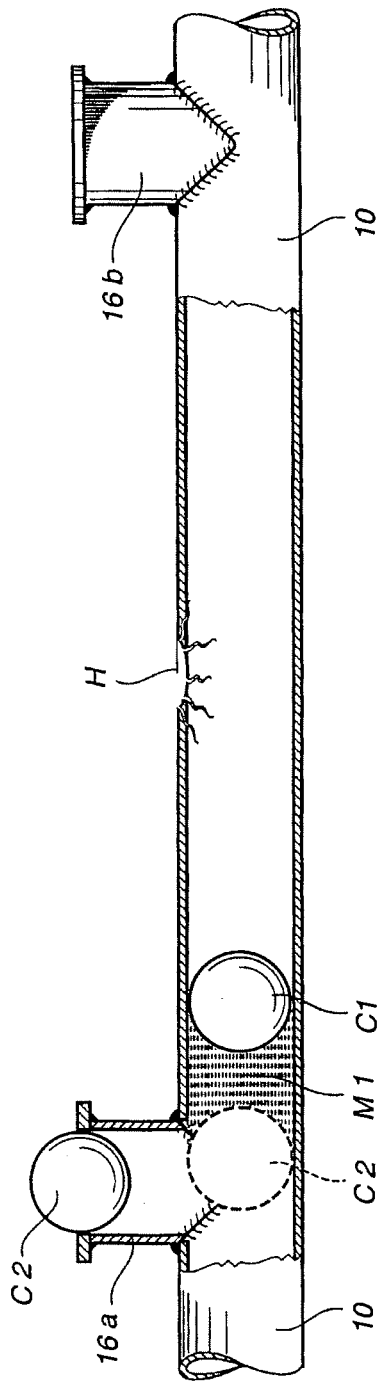

In the next stage (FIG. 2a), a first spherical body C1 is inserted through the manhole 16a down into the pipe 10. Right thereafter a viscose sealing material M1, the chemical formula of which will be given below, is filled into the pipe, followed by a second spherical body C2 (FIG. 2b). The bodies C1 and C2 acting as pistons, are preferably made of a semi-rigid material such as Polyurethane so that they may easily pass through the pipe which may have bumps and protrusions along its inner surface.

Figure 2C:
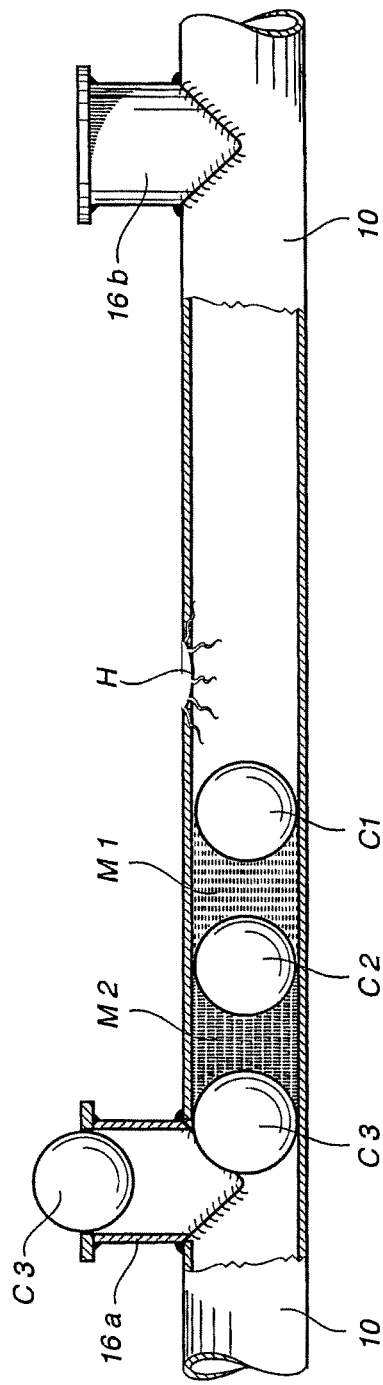

It should be emphasized at this stage that the sealing method as proposed according to the present invention can be applied by using the spherical bodies C1 and C2 and a viscose sealing material M1 only, in the exact manner as will be described further below. However, it is highly preferable to use a combination of materials M1 and M2, which needs the introduction of a third spherical body C3, as depicted in FIG. 2c. The advantages of this last-mentioned feature will be explained in detail below.

Whether or not the option of FIG. 2c is adopted, the material M1 (as well as M2) should be compressed during the repair process to allow its penetration into the crack/hole H.

Figure 2D:
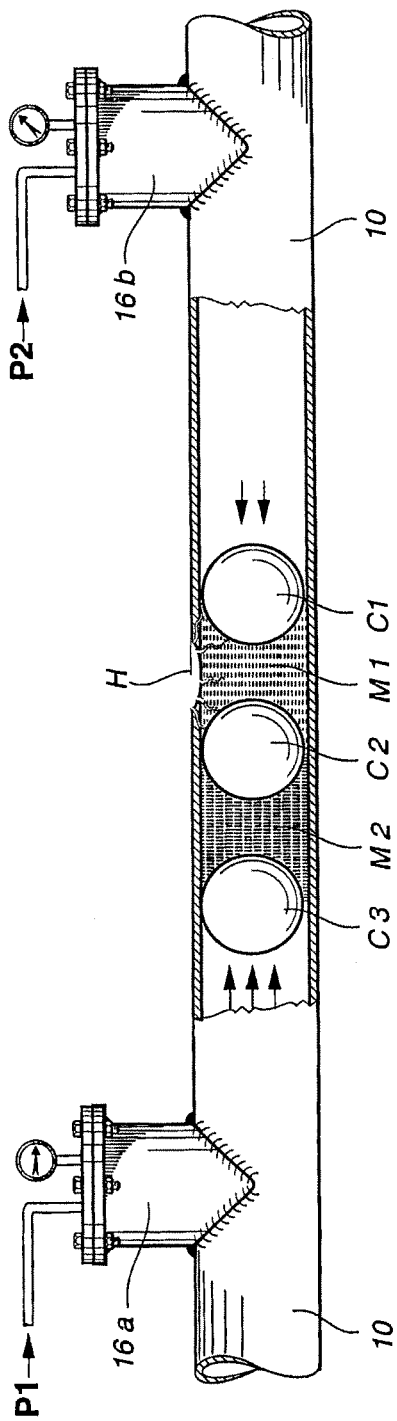

To this end, pressure should be applied from both sides of the array C2-M1-C1 (or C3-M2-C2-M1-C1). For this purpose, as seen in FIG. 2d, the manholes 16a and 16b are closed and a pressurized fluid or gas is pumped into the pipe 10 in order to press the bodies C1, C2 and C3 one against the other and hence compact the materials M1 and M2.

It is further requested that the pressure $P_1$ applied from 16a be somewhat greater then that $P_2$ applied from the opposite side, which pressure difference will cause the propagation of the array C3-M2-C2-M1-C1, in unison, in the direction of the manhole 16b.

The amount of pressure $P_2$ that should be applied against the array is preferably given by the formula:

$$P_2 \geq a - b/D$$

wherein:
$P_2$—pressure (bar);
a—an empirical factor that varies between 2.5 and 3.5;
b—an empirical factor that varies between 0.035 and 0.045; and
D—diameter of the pipe (meters).

Figure 2E:
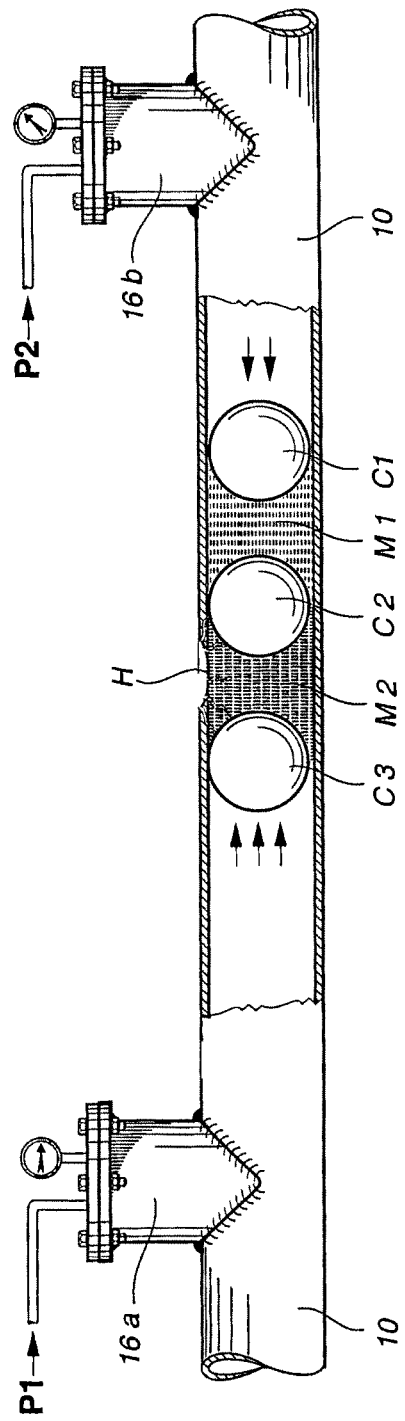

During the travel of the array, as shown in FIG. 2d and FIG. 2e, there will be formed on the inside surface of the pipe 10, including the crack H, a first layer of the material M1, and over it a second layer of the material M2. A chemical interaction between these two layers will bring to the solidification of their combination and assure the complete, durable filling of the crack H (see below).

Figure 2F:
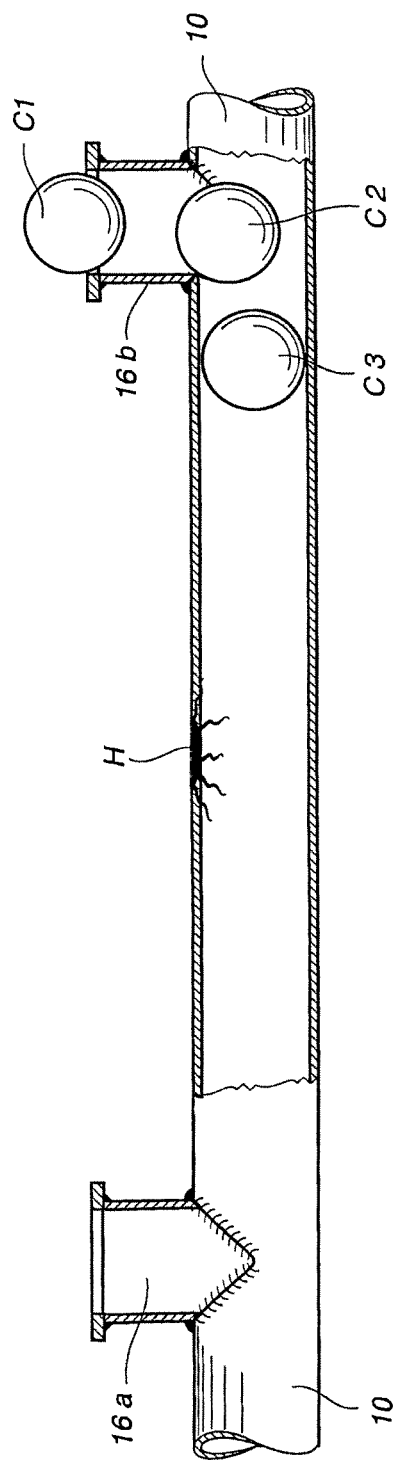

In the further stage (FIG. 2f) the bodies C1 and C2 (and C3—if applicable) are retrieved through the manhole 16b.

Figure 2G:
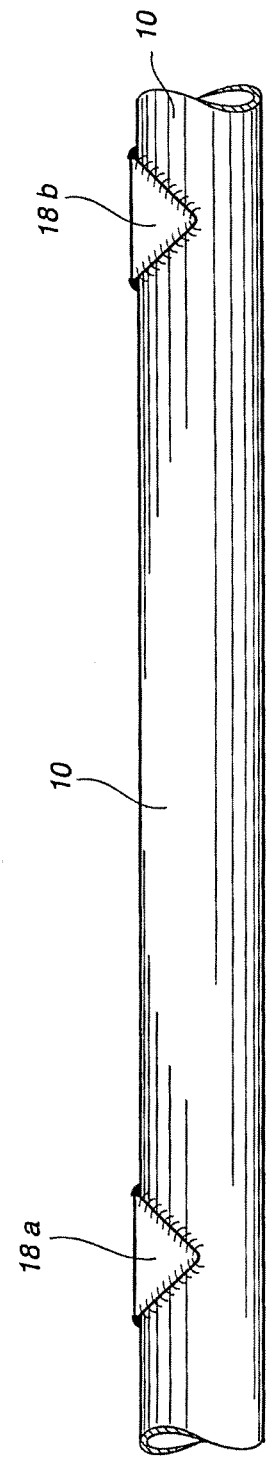

The pipe sections 16a and 16b are then removed and replaced by covers 18a and 18b of any conventional type (FIG. 2g).

Figure 3A:
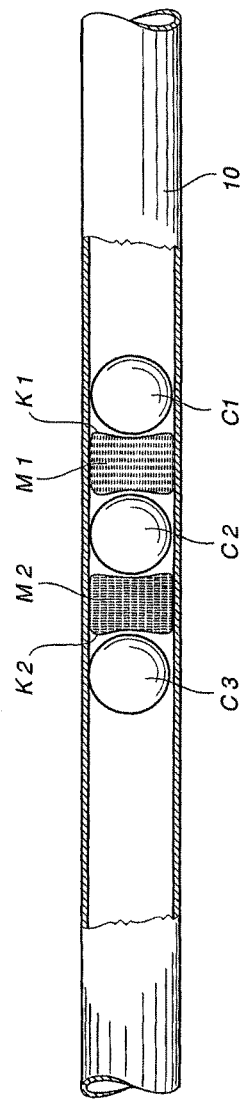
FIGS. 3a and 3b illustrate a way of nesting the respective sealing materials in their desired locations.

According to a preferred embodiment of this invention (FIG. 3a), in order to prevent their spreading away in different directions while passing from the manhole 16a into the pipe 10, the materials M1 and M2 are supplied in bags K1 and K2, respectively.

Figure 3B:
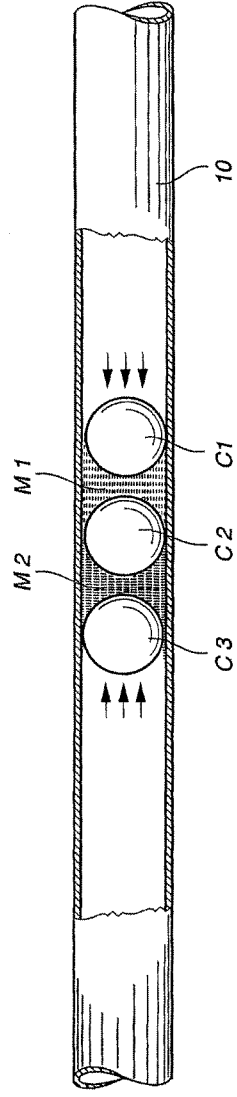

The bags are preferably made of a readily tearable sheet material, such as cellophane or polyethylene, so that they become ruptured when pressure is applied to the array from both sides (FIG. 3b). Upon the tearing of the bags, the materials will intensively contact and wet the inner surface of the pipe and penetrate the cracks once reaching them.

Let us now turn to the specification of the materials recommended according to an additional aspect of the present invention.

In an embodiment wherein only one sealing material M1 is employed, the material should be selected from the group of conventional hardeners.

In the preferred embodiment, according to which two materials M1 and M2 are used, the materials may consist of a mix of a compound A, a hardener B a softener S, a filler mineral Z, an elastic filler E and a hard filler D, wherein:
A is an organic polycondensate compound;
B is a hardener such as phenylenediamine or diaminodifenylsulfone;
S is a softener such as dibutyl phthalate or diphenyl phthalate;
Z is a filler mineral such as ash of granular size ranging between 2 to 15 microns;
E is an elastic filler such as the commercially known "Isoltherm™" (described in U.S. Pat. No. 6,057,378) of size ranging between 4 to 7 millimeters; and
D is a hard filler such as granules of nylon of size ranging between 1 to 4 millimeters.

The proportional amount of each of the components regarding the respective materials is given below (in weight parts).

Material M1
100 units of component A, 0-10 units of component S, 110-130 units of component Z, and component B, the amount of which is given by the formula:

$$B = A*\lambda - K_1$$

Wherein:
$K_1$—an empirical factor that varies between 0 and 25; and
$\lambda$—an empirical factor that varies between 02-0.45.

Material M2
20-60 units of component A, 0-10 units of component S, 50-100 units of component Z and component B, the amount of which is given by the formula:

$$B = A*\lambda + K_2$$

Wherein:
$K_2$—an empirical factor that varies between 0 and 30; and
$\lambda$—an empirical factor that varies between 02-0.45.

Additionally, material M2 should contain 10-15 units of component E and 5-10 units of component D that are meant to penetrate the crack together with material M2 and create a partial barrier between the filling materials and the fluid upon restarting of the flow in the pipe, so that the filling will not become washed away.

The total amount of the sealing materials that should be injected between two adjacent spherical bodies is given by the formula:

$$G \geq \rho D$$

wherein:
G—quantity (tons);
$\rho$—an empirical factor that varies between 1 and 1.2; and
D—internal diameter of the pipe (meters).

The time that will take for the combination of the materials M1 and M2 to solidify is expected to follow the formula:

$$T \geq \gamma L D$$

Wherein:
T—time (hours);
$\gamma$—an empirical factor that varies between 2.5 and 15;
L—length of pipe (kilometers); and
D—internal diameter of the pipe (meters).

After that period of time it will be safe to renew the flow through the pipe without the danger of washing away the seal layer.

In order to achieve optimal results in regard to the solidification of the combination of these two materials, according to a preferable embodiment, the first material M1 should contain a certain amount of material M2, and the material M2 should contain a certain amount of material M1. This could be achieved either by simply mixing all the ingredients together or by using capsules that contain M1 and M2 and inserting them into the bags of M2 or M1, respectively, so that when material M1 is pushed into the crack, the capsules will break and release a preset quantity of the material M2.

While the invention as herein described includes numerous specifics it should be readily apprehended by those skilled in the art to which the invention pertains that the scope thereof should not be limited by such specifics but rather in and by the appended claims.

What is claimed is:

1. A sealing agent formulation for in situ repair of a leakage at an unknown site in a pipeline, the sealing agent formulation comprising a first viscous sealing material comprising a hardener and at least one filler, wherein the hardener and the at least one filler are selected such that the hardener and the at least one filler are pre-mixable before insertion in the pipeline, and wherein said sealing agent formulation is formulated to (i) be compressed under pressure and to penetrate, seal, and solidify in at least one of a hole and a crack in said pipeline, (ii) form at least one layer in a vicinity of said leakage without coating the pipeline along a circumferential and a longitudinal extent thereof, and (iii) provide durable filling of said at least one of said hole and said crack to provide the in situ repair thereof at said unknown site.

2. The sealing agent formulation according to claim 1, further comprising a second viscous sealing material.

3. The sealing agent formulation according to claim 2, wherein each of the first and second viscous sealing materials comprises a mix of at least three constituent materials selected from the group consisting of an organic polycondensate compound, a hardener, a softener, a filler mineral, an elastic filler, and a hard filler.

4. The sealing agent formulation according to claim 2, wherein said second viscous sealing material comprises:
   20 to 60 units by weight of an organic polycondensate compound;
   0 to 10 units by weight of a softener;
   50 to 100 units by weight of a ground filler material;
   a hardener; and
   an elastic filler.

5. The sealing agent formulation according to claim 4, wherein an amount $B_2$ (in units by weight) of the hardener in the second viscous sealing material is given by a formula $B_2=A_2\lambda+K_2$, where $A_2$ is an amount (in units by weight) of the organic polycondensate compound in the second viscous sealing material, $\lambda$ is an empirical factor between 0.2 and 0.45, and $K_2$ is an empirical factor between 0 and 30.

6. The sealing agent formulation according to claim 4, wherein an amount of the elastic filler in the second viscous sealing material is 10-15 units by weight.

7. The sealing agent formulation according to claim 4, wherein the second viscous sealing material further comprises a hard filler.

8. The sealing agent formulation according to claim 4, wherein an amount of the hard filler in the second viscous sealing material is 5-10 units by weight.

9. The sealing agent formulation according to claim 1, wherein the hardener is selected from the group consisting of phenylenediamine, and diamino-diphenylsulfone.

10. The sealing agent formulation according to claim 1, wherein the first viscous sealing material comprises an organic polycondensate compound.

11. The sealing agent formulation according to claim 1, wherein the first viscous sealing material comprises a softener selected from the group consisting of dibuthylphtalate, and diphenylphtalate.

12. The sealing agent formulation according to claim 1, wherein the filler includes particles having a particle size between 2 and 15 microns.

13. The sealing agent formulation according to claim 1, wherein the filler is an elastic filler that includes particles having a particle size between 4 and 7 millimeters.

14. The sealing agent formulation according to claim 1, wherein the filler is a ground filler and said first viscous sealing material comprises:
   100 units by weight of an organic polycondensate compound;
   0 to 10 units by weight of a softener; and
   110 to 130 units by weight of a ground filler.

15. The sealing agent formulation according to claim 14, wherein an amount $B_1$ of the hardener (in units by weight) is given by a formula $B_1=A_1\lambda+K_1$, where $A_1$ is an amount (in units by weight) of the organic polycondensate compound in the first viscous sealing material, $\lambda$ is an empirical factor between 0.2 and 0.45, and $K_1$ is an empirical factor between 0 and 25.

16. A sealing agent formulation for in situ repair of a pipeline, the sealing agent formulation comprising a first viscous sealing material comprising:
   a hardener selected from the group consisting of phenylenediamine, and diamino-diphenylsulfone; and
   at least one filler comprising ash having a granular size in a range between 2 and 15 microns;
   wherein the hardener and the at least one filler are selected such that the hardener and the at least one filler are pre-mixable before insertion in the pipeline, and wherein said sealing agent formulation is formulated to (i) be compressed under pressure and to penetrate, seal, and solidify in at least one of a hole and a crack in said pipeline, and (ii) provide durable filling of said at least one of said hole and said crack to provide the in situ repair thereof.

* * * * *